3,169,941
ISOBORNYLOXY PHENYLAMINES
Gerhard H. Alt, University City, Mo., and Gene R. Wilder, St. Albans, W. Va., assignors to Monsanto Company, St. Louis, Mo., a corporation of Delaware
No Drawing. Filed June 13, 1960, Ser. No. 35,411
8 Claims. (Cl. 260—45.9)

This invention relates to a new class of compounds and more particularly to isobornyloxy phenylamines, to the preservation of rubber with the new compounds and to rubber vulcanizates containing them.

Rubber deteriorates upon aging and it has long been known that its deterioration can be greatly retarded by treatment before or after vulcanization with substances known as age resistors or antioxidants. Surface cracking was soon recognized to be an independent phenomena. It was initially assumed to result from action of ultra violet light but it is now known that ozone is one of the major causes. Because styrene-butadiene copolymer is more susceptible to surface cracking than natural rubber its widespread use has intensified the problem. Surface cracking accelerates greatly when the rubber is under strain. Unfortunately, efficient antioxidants are not necessarily effective for preventing exposure cracking.

Preventing exposure cracking requires presence of the inhibitor on the surface of the rubber. Indeed, wax coatings are widely used and are effective if nothing disturbs or breaks the protective film during service. Similarly, chemical catalytic inhibition is believed to require continuous presence of inhibitor at the rubber surface. Ability to migrate through the rubber has been postulated to be required for preventing exposure cracking. This view has been supported by the observation that adjuvants which are known from experience to prevent exposure cracking migrate readily and are often quite volatile. Migration and volatility are not unmixed blessings, however, because they result in gradual loss of protection. An antidegradant of fugitive nature has only limited use. Moreover, the antidegradant may exert a detrimental effect on other objects with which it comes in contact. Amine antidegradants usually suffer from the disadvantage that they discolor rubber stocks in which they are incorporated. While this is not serious and scarcely noticeable in dark colored stocks containing carbon black, it cannot be tolerated in white rubber stocks. The antidegradants of this invention do not seriously discolor light colored rubber stocks.

An object of the invention is to provide compounds which inhibit both degradation caused by ozone and degradation due to heat, aging and oxidation. A further object is to provide new amine antidegradants of reduced volatility, migration and discoloring characteristics. A further object is to provide rubber articles both natural and synthetic, vulcanized and unvulcanized, which resist deteriorating influence of air, ozone, oxygen, heat, light, aging and flex-cracking for extended periods. A still further object is to provide improved amine antidegradants which can be economically manufactured by existing procedures from readily available raw materials. Further objects will in part be apparent and in part pointed out in the detailed description following.

The intermediate for isobornyloxy phenylamines was made from p-nitrophenol and camphene. To a mixture of 13.9 grams (0.1 mole) of p-nitrophenol, 20 ml. of chloroform and 1 ml. of $BF_3$ etherate was added a solution of 20 grams (0.147 mole) of camphene in 15 ml. of chloroform. The addition was carried out with cooling so as to keep the temperature below 25° C. The reaction mixture was stirred at room temperature for 14 hours, then diluted with ether and washed well with 10% sodium hydroxide solution and water to remove unreacted p-nitrophenol. The aqueous washings were made up to 1000 ml. with water and an aliquot titrated for p-nitrophenol. The p-nitrophenol recovered amounts to 0.028 mole, equivalent to 72% conversion. The ethereal solution was dried and evaporated to give 31 grams oil which crystallized on cooling. The product was taken up in 35 ml. of light petroleum (B.P. 30–60°), the solution cooled and the product filtered off. Yield 16.9 grams (86% on p-nitrophenol) of isobornyl p-nitrophenyl ether, M.P. 91–95° C.

Isobornyl p-nitrophenyl ether, 127 grams (0.462 mole) in 200 ml. of ethanol was reduced in a Parr hydrogenation apparatus using 5% palladium on charcoal catalyst (2 grams) and 50 p.s.i. of hydrogen. Hydrogenation was complete after 4 hours. The catalyst was removed by filtration and the ethanol stripped by distillation. The residual oil was distilled through a short column under high vacuum. Isobornyl p-aminophenyl ether had a B.P. of 140–147° at 0.6 mm. It crystallized on standing to a material M.P. 40–45° C. The yield was 106.5 grams or 94%. Perchloric acid titration assay=97%.

For use in preventing the degradation of rubber it is preferred to replace one of the hydrogens on the amino group with an aliphatic radical. The aliphatic radical may be either straight or branhced chain alkyl group preferably of 1–20 carbon atoms or cycloalkyl group including alkyl substituted cycloalkyl groups. Examples of suitable substituents comprise methyl, ethyl, n-propyl, isopropyl, n-butyl, isobutyl, sec-butyl, tert-butyl, amyl, hexyl, octyl, sec-octyl, nonyl, decyl, dodecyl, octadecyl, cyclohexyl, 2-methylcyclohexyl, 3-methylcyclohexyl, 4-methylcyclohexyl, ethylcyclohexyl, propylcyclohexyl, isopropylcyclohexyl, butylcyclohexyl, amylcyclohexy, cycopentyl, methylcyclopentyl, ethylcyclopentyl, propylcyclopentyl, isopropylcyclopentyl, butylcyclopentyl and amylcyclopentyl.

Various methods are available for converting the primary amino group to a secondary amino group. The technique of accomplishing this by reductive alkylation is illustrated in detail below.

Into a suitable reactor fitted with a Dean-Stark trap was charged 80.9 grams (0.33 mole) of isobornyl p-aminophenyl ether and 150 grams (1.5 moles) of cyclohexanone. The Schiff's base was formed under 120 mm. Hg below 100° C. When the quantity of water calculated for the desired reaction was collected, the excess cyclohexanone was stripped off under reduced pressure. Heating was continued until the pot temperature was 120° C./15 mm. Hg.

The Schiff's base thus prepared was charged into a pressure autoclave, 150 grams of isopropanol and 5 grams of catalyst consisting of 5% palladium on carbon carrier added and the mass hydrogenated up to 120° C. with hydrogen under 500 p.s.i. pressure. When theoretical quantity of hydrogen had been absorbed the contents of the autoclave were cooled, the autoclave vented and the contents filtered. The filtered product was stripped of solvent and the residue vacuum distilled. The fraction B.P. 184–186° C./0.2 mm. (205.7° C./0.8 mm.) was collected. The N - [4 - (2-isobornyloxy)phenyl]cyclohexylamine so obtained was a clear liquid.

Into a suitable pressure autoclave was charged 50 grams (0.204 mole) of isobornyl p-aminophenyl ether, 200 grams (3.45 moles) of acetone and 4 grams of 5% palladium on carbon as catalyst and the autoclave purged several times with hydrogen. The system was then placed under 500 p.s.i. of hydrogen and heated to 100–120° C. After approximately one hour theoretical amount of hydrogen had been absorbed. The autoclave was then cooled to room temperature and the contents filtered. The filtered mixture was stripped of solvent and the residue vacuum distilled. The fraction boiling at 163–164° C./0.9 mm. was collected. N-isopropyl-4-(4-isobornyloxy)aniline was obtained in 75.2% yield as a clear liquid.

As a specific embodiment of the invention illustrating the antidegradant properties, a rubber base composition was compounded comprising:

| Base stock A | parts by weight |
|---|---|
| Smoked sheets rubber | 100.0 |
| Carbon black | 50.0 |
| Zinc oxide | 5.0 |
| Stearic acid | 3.0 |
| Sulfur | 2.5 |
| Saturated hydrocarbon softener | 3.0 |
| N-cyclohexyl-2-benzothiazolesulfenamide | 0.5 |

To the base composition was added 1.5 parts by weight of antidegradant and the composition cured by heating 45 minutes at 144° C. The stocks were then aged under various conditions and the proportion of the original tensile strength retained after aging observed. In the results recorded below, test tube aging refers to results by the test tube method, A.S.T.M. designation D865–57, A.S.T.M. Standards, 1958, p. 1453.

*Table I*

| Antidegradant | Percent Retention of Ultimate Tensile Strength | | |
|---|---|---|---|
| | Test Tube Aging | | Air bomb Aging, 4 hrs./ 121° C. Under 80# air pressure/in.$^2$ |
| | 48 Hrs. at 100° C. | 72 Hrs. at 100° C. | |
| None | 27 | 8 | 20 |
| N-(4-Isobornyloxyphenyl) cyclohexylamine | 76 | 62 | 62 |
| N-Isopropyl-4-isobornyl-oxyaniline | 75 | 55 | 64 |

These data demonstrate that the new antidegradants prevent deterioration by air or oxygen.

To demonstrate the anti-exposure cracking properties, tests were conducted in the above-described natural rubber base stock A and in rubber base stocks comprising:

| | Base Stock B, parts by weight | Base Stock C, parts by weight |
|---|---|---|
| Pale crepe rubber | 100 | |
| SBR 1500 Rubber | | 100 |
| Carbon black | | 50 |
| Titanium dioxide | 50 | |
| Zinc oxide | 25 | 4 |
| Clay | 15 | |
| Stearic acid | 1 | 2 |
| Sulfur | 3 | 1.75 |
| 2,2'-Dithiobis benzothiazole | 0.6 | |
| Diphenylguanidine | 0.15 | |
| Saturated hydrocarbon softener | | 10 |
| N-Cyclohexyl-2-benzothiazole-sulfenamide | | 1 |

SBR 1500 is styrene-butadiene copolymer rubber, the bound styrene content of which is 23.5%. Antioxidant is added but this has no significant effect in preventing exposure cracking. In each case the amount of antidegradant was 1.5 parts by weight. The stocks compounded from base stock B were cured by heating in a press 45 minutes at 144° C. and those from base stock B by heating in a press for 60 minutes at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks were cured in the form of a belt ½ inch wide, ¼ inch thick and 5%6 inch inside diameter and mounted on 1 inch diameter shafts. The ozone concentration was maintained at 20–30 parts per hundred million throughout the test and the shafts rotated at 75 r.p.m. In this manner a momentary elongation through a range of 0–20% was provided at any portion of the test specimens passing over the shaft. Further details of the apparatus and procedure employed were described by Creed et al. in Analytical Chemistry, vol. 25, page 241, February 1953. The test specimens were compared visually to previously selected standards at regular intervals, noting the extent of cracking. The standards represented different degrees of cracking on a numerical scale of 1–6 on which 1 represented no cracking and 6 extremely severe cracking. Severity of cracking was assigned numerical ratings in this manner. By plotting the severity of cracking on the Y axis in inverse order versus time of exposure on the X axis, curves are obtained which relate severity of cracking and time. Comparative results were obtained by determining and comparing the areas under the curves. The results were expressed on the basis of the blank or unprotected stock as 100. Thus, a value of 200 means that the area under the above-described curve was twice that of the unprotected stock.

*Table II*

| Antidegradant | Protection Rating Against Ozone | | |
|---|---|---|---|
| | Natural Base A | Rubber Base B | Styrene-Butadiene Copolymer Rubber Base C |
| None | 100 | 100 | 100 |
| N-(4-Isobornyloxyphenyl)-cyclohexylamine | 210 | 175 | 196 |
| N-Isopropyl-4-isobornyl-oxyaniline | 245 | 185 | 197 |

Stress relaxation measurements afford another important demonstration of antidegradant properties. A weight was affixed to one end of a cured strip of rubber, the other end of which was maintained in fixed position. Gradual relaxation of stress was followed by periodically measuring the elongation. The time for elongation to increase 100% was recorded. This test, commonly referred to as creep test, furnishes a reliable indication of fugitiveness of an antidegradant. The applied loads were 60 pounds per square inch and 45 pounds per square inch respectively to base stocks A and B. In each case the amount of antidegradant was 1.5 parts by weight.

*Table III*

| Antidegradant | Creep—Hours to 100% Increase in Elongation | |
|---|---|---|
| | Base A | Base B |
| None | 42 | 30 |
| N-(4-Isobornyloxyphenyl)cyclohexylamine | 80 | 96 |
| N-Isopropyl-4-isobornyloxyaniline | 58 | 66 |

Resistance to discoloration was evaluated on vulcanizates obtained from base stock B. Samples of the vulcanizates were exposed for 72 hours in a fadeometer. A carbon arc supplied the light. Other samples were exposed for 24 hours to ultraviolet light from a sunlamp. The percentage of light reflected from the surface of the samples after exposure was recorded.

Table IV

| Antidegradant | Percent Reflectivity under a sunlamp | | Percent Reflectance in a fadeometer | |
| --- | --- | --- | --- | --- |
| | Unexposed | After 24 Hrs. | Unexposed | After 72 Hrs. |
| Blank | 84 | 80 | 89 | 80 |
| N-(4-Isobornylxyphenyl)-cyclohexylamine | 79 | 69 | 88 | 76 |
| N-Isopropyl-4-isobornyl-oxyaniline | 82 | 67 | 86 | 75 |

The antidegradants may be used for protection of different kinds of rubber than those particularly mentioned above. They may be employed for the protection of natural rubber in its various forms, as for example latex, crepe, smoked sheets, gutta-percha, balata and cyclo rubbers. They are applicable generally for protection of natural and synthetic elastomers which deteriorate by absorbing oxygen and ozone from the atmosphere, as for example polybutadiene, polyisoprene and isobutylene polymerized with a small proportion of a diolefin. They are useful for protecting unvulcanized as well as vulcanized rubber. The antidegradants may be added with advantage to styrene-butadiene rubber at the time of manufacture. The protection then persists throughout storage, compounding, curing and service of the rubber article.

The amounts used in the rubber will vary depending upon the particular stock and purpose of the compounder. In general, amounts within the range of 0.1–5 parts encompass the range normally used. In case of massed rubber the antidegradant will ordinarily be incorporated by milling or similar mixing and masticating procedure but applying to the surface of rubber is also effective.

It is intended to cover all changes and modifications of the examples of the invention herein chosen for purposes of disclosure which do not constitute departures from the spirit and scope of the invention.

What is claimed is:

1. Sulfur vulcanizable diene rubber composition which deteriorates by absorbing oxygen and ozone from the atmosphere containing a small amount sufficient to inhibit degradation of compounds of the structure

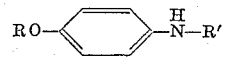

where R represents 2-isobornyl and R' is selected from a group consisting of hydrogen, alkyl of 1–20 carbon atoms inclusive and alicyclic radicals containing at least 5 but not more than 6 ring carbon atoms.

2. Sulfur vulcanizable diene rubber composition which deteriorates by absorbing oxygen and ozone from the atmosphere containing a small amount sufficient to inhibit degradation of compounds of the structure

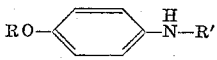

where R represents 2-isobornyl and R' represents alkyl of 1–20 carbon atoms inclusive.

3. Sulfur vulcanizable diene rubber composition which deteriorates by absorbing oxygen and ozone from the atmosphere containing a small amount sufficient to inhibit degradation of N - (4 - isobornyloxyphenyl)cyclohexylamine.

4. Sulfur vulcanizable diene rubber composition which deteriorates by absorbing oxygen and ozone from the atmosphere containing a small amount sufficient to inhibit degradation of N-isopropyl-4-isobornyloxyaniline.

5. 2-isobornyl p-aminophenyl ether.
6. N-(4-isobornyloxyphenyl)cyclohexylamine.
7. N-isopropyl-4-isobornyloxyaniline.
8. A compound of the structure

where R represents 2-isobornyl and R' is selected from a group consisting of hydrogen, alkyl of 1–20 carbon atoms inclusive and alicyclic radicals containing at least 5 but not more than 6 ring carbon atoms.

References Cited in the file of this patent

FOREIGN PATENTS 1,225,727    France _____ Feb. 22, 1960